June 26, 1962
K. WILFERT
3,040,832
MOTOR VEHICLE HANDLE ARRANGEMENT
Filed June 15, 1959
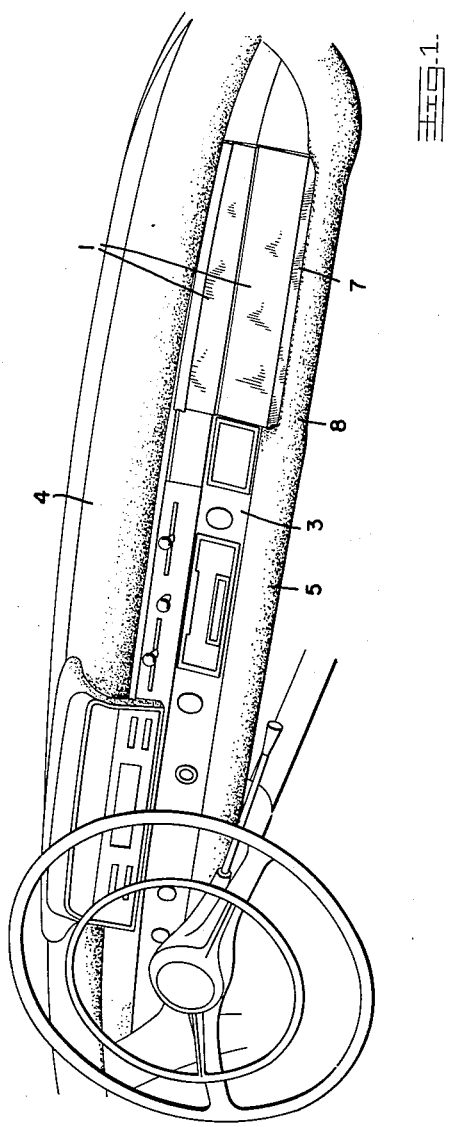
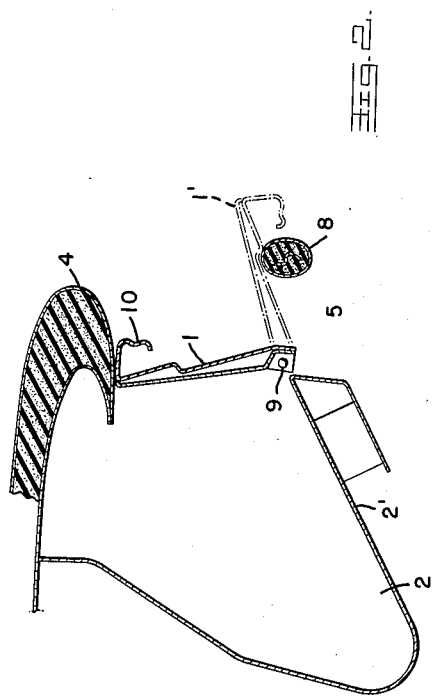
INVENTOR.
KARL WILFERT
BY
Dicke, Craig and Freudenberg
ATTORNEYS

United States Patent Office 3,040,832
Patented June 26, 1962

3,040,832
MOTOR VEHICLE HANDLE ARRANGEMENT
Karl Wilfert, Stuttgart-Degerloch, Germany, assignor to Daimler-Benz Aktiengesellschaft, Stuttgart-Unterturkheim, Germany
Filed June 15, 1959, Ser. No. 820,503
Claims priority, application Germany June 24, 1958
4 Claims. (Cl. 180—90)

The present invention relates to an improvement and further development of safety handles or gripping devices disposed along the forward wall of motor vehicles, especially for the passenger seated alongside the driver.

The present invention essentially consists in that the handle or gripping member is arranged with respect to the lid of a glove compartment provided in the forward vehicle wall, such as the dash board, or in the instrument panel at such a height and distance therefrom that the handle or gripping member, with an opened glove compartment lid, serves simultaneously as abutment therefor, preferably in such a manner that the bottom of the glove compartment and the inner, then exposed surface of the lid come to lie essentially in a single plane. The gripping or holding member is either provided with padding itself or is organically built into a padded ledge extending along the lower side of the instrument panel.

By the arrangement in accordance with the present invention, separate securing means for the glove-compartment cover or lid may be dispensed with at the hinge of the glove-compartment lid. Similarly, suspension means for retaining the glove-compartment lid, for example, in the form of chains, bands or scissor devices, or supporting ledge members or similar means adapted to pivot out of the fire wall may be dispensed with in accordance with the present invention.

By the same token, the gripping or handle member according to the present invention fulfills a dual purpose since it serves, in addition to its function as lid support, simultaneously as safety padding disposed in front of the fire wall or instrument panel.

Another considerable advantage which is obtained in accordance with the present invention resides in the fact that the glove-compartment lid may be made of any desired size, especially of any desired width, possibly even of greater width than the glove compartment aperture, and may thereby be used as support adapted to support thereon even relatively heavy objects or may even be used as auxiliary table.

Accordingly, it is an object of the present invention to provide an arrangement for a handle member or holding device along the dashboard or instrument panel of a motor vehicle which is simple in construction and effective as a safety measure while at the same time serving as support for the pivotal lids or covers for compartments provided in the dashboard.

Another object of the present invention resides in the provision of a handle or holding member arranged along the dashboard or instrument panel of a motor vehicle which makes possible to dispense with the usual stop means for the pivotal lid or cover normally used to close the compartment such as the glove-compartment.

A further object of the present invention is the provision of a support, in the form of a padded handle, for the lid or cover of the glove-compartment disposed with in the instrument panel of a motor vehicle which makes it possible to utilize relatively large lids supported sufficiently so as to support thereon even relatively heavy objects.

These and other objects, features and advantages of the present invention will become more obvious from the following description when taken in connection with the accompanying drawing, which shows, for purposes of illustration only, one embodiment in accordance with the present invention, and wherein:

FIGURE 1 is a partial perspective view of a dashboard-instrument panel arrangement of a motor vehicle provided with a safety handle in accordance with the present invention, and FIGURE 2 is a vertical cross-sectional view through the instrument panel and dashboard arrangement in accordance with the present invention taken within the area of the glove-compartment lid thereof.

Referring now to the drawing, wherein like reference numerals are used throughout the two views thereof to designate like parts, and more particularly to FIGURE 1, reference numeral 1 designates a pivotal lid or cover adapted to close off the glove compartment 2 arranged in the part of the instrument panel 3 which is normally disposed in front of the passenger seat disposed alongside the driver's seat whereby the normal instrument cluster is arranged within the instrument panel 3 in front of the driver's seat. The instrument panel is arranged between an upper padded ledge member 4 and a lower padded ledge member 5.

According to the present invention, a handle member or gripping device 8 is produced in the lower bulged padding 5 by a recess 7 extending over the length of the lid 1 within the region of the glove-compartment lid 1. The handle member 8 has either a round or oval cross section as can be readily seen from FIGURE 2. The upper edge of the handle member 8 is disposed at such a height and at such a distance from lid 1, namely approximately at the height of the hinge axis 9 of the lid 1 that the inner surface of the lid in the opened position thereof, illustrated in FIGURE 2 in dot-and-dash line is disposed in essentially one and the same plane with the bottom surface 2' of the glove-compartment 2. A decorative strip 10 which, for example, completes a decorative strip extending along the upper edge of the instrument panel, serves as handle for the lid 1. However, it is understood that the decorative handle strip 10 may also be replaced by any suitable push-button or pull-member or other opening device.

It is not absolutely necessary for purposes of achieving the present invention that the recess 7 determining the configuration and shape of the handle 8 be extended completely through the lower padded ledge member 5. Instead, a trough-shaped recess arranged only along the upper side of the padded member 5 may also be used which, however, is sufficiently deep in order to produce a safety handle or holding member at the desired place.

The manner of functioning and operation of the present invention is believed quite obvious from an inspection of FIGURE 2.

While I have shown and described one embodiment in accordance with the present invention, it is understood that the same is not limited thereto but is susceptible of many changes and modifications within the spirit and scope of the present invention, and I, therefore, do not wish to be limited to the details described and illustrated herein, but intend to cover all such changes and modifications as are encompassed by the scope of the appended claims.

I claim:
1. In a motor vehicle having a front seat means for the driver and at least one passenger and provided with a forward vehicle wall and a compartment formed within said forward vehicle wall, lid means for said compartment pivotally secured approximately at the bottom edge thereof at said forward vehicle wall, said forward vehicle wall including padded ledge means below said lid means for said compartment arranged in front of the seat for the passenger seated alongside the driver of the vehicle, said padded ledge means including a portion in front of said compartment spaced outwardly from the bottom edge of said lid means and forming a safety handle means, said handle means being arranged and disposed at such a height and distance with respect to said lid means as to effectively serve as a support for said lid means in the open position thereof, the upper surface of said lid means in the opened position thereof being disposed essentially in the same plane as the inner surface of the bottom of said compartment.

2. In a motor vehicle the combination according to claim 1, wherein said handle means is of approximately cylindrical shape in cross section.

3. In a motor vehicle the combination according to claim 1, wherein said handle means is of oval cross section with the major axis disposed in the up-and-down direction.

4. In the motor vehicle having front seat means for the driver and at least one passenger and provided with a forward vehicle wall and with a compartment formed in said forward vehicle wall, lid means for said compartment pivotally secured at said forward vehicle wall, said forward vehicle wall including a padded ledge member below said lid means for said compartment arranged in front of the seat for the passenger seated alongside the driver of the vehicle, said padded ledge member being provided in the upper surface thereof with a recess forming a safety handle means, said handle means being arranged and disposed at such height and distance with respect to said lid means as to effectively serve as support for said lid means in the open position thereof, and the surface of said lid means, in the fully opened position thereof, being disposed essentially in the same plane as the inner surface of the bottom of said compartment.

References Cited in the file of this patent

UNITED STATES PATENTS

| | | |
|---|---|---|
| D. 182,011 | Wilfert | Jan. 28, 1958 |
| 2,039,503 | Tjaarda | May 5, 1936 |
| 2,072,655 | Tjaarda | Mar. 2, 1937 |
| 2,382,011 | Howard | Aug. 14, 1945 |
| 2,672,103 | Holmes | Mar. 16, 1954 |
| 2,689,764 | Park | Sept. 21, 1954 |

FOREIGN PATENTS

| | | |
|---|---|---|
| 799,774 | Great Britain | Aug. 13, 1958 |